Oct. 12, 1937.  W. C. McKEOWN  2,095,568
FUEL ECONOMIZER
Filed April 15, 1935

William C. McKeown,
Inventor.
By Emil Kuhart
Attorney.

Patented Oct. 12, 1937

2,095,568

UNITED STATES PATENT OFFICE 2,095,568

FUEL ECONOMIZER

William C. McKeown, Buffalo, N. Y.

Application April 15, 1935, Serial No. 16,301

1 Claim. (Cl. 110—75)

My invention relates to a fuel economizer for use in connection with boilers or furnaces.

The primary object of my invention is to provide a device for economizing in the consumption of fuel, capable of being attached to or installed in a furnace or boiler without in any manner altering the latter and whereby, if desired, buckwheat or other small size coal can be burned economically and efficiently in an ordinary home furnace or boiler, thus reducing the cost of heating a home since more heat units are produced by the small size coal, at a lower price per ton, than is possible with the ordinary furnace burning the more expensive grades, such as stove, nut, or egg-size coal.

Another object of my invention is to provide an attachment for a boiler or furnace whereby pre-heated air is introduced into the combustion chamber at an angle to the travel of the products of combustion within said chamber so that the ascending gases are intersected by the preheated stream of air and the unconsumed portions ignited thereby.

Another object of my invention is to provide a device of this kind which is attached directly to the fuel-feed door closing the opening leading to the combustion chamber and introducing air therethrough by admitting the same to said chamber through the usual damper-openings in the door.

Another object of my invention is to so construct the device that it can be utilized with equal effectiveness in boilers or furnaces having deep or shallow fuel-feed openings.

Another object of my invention is to provide a device of this kind which is secured to the inner side of the door closing the fuel-feed opening leading to the combustion chamber, the device extending inwardly from the door over the bed of fuel; no cutting or alterations to the door or any portion of the boiler or furnace being required for the installation of the device.

A further object is to provide a device which will at all times supply a constant flow of pre-heated air to the combustion chamber directly over the bed of fuel; the device being so constructed that the air will travel therethrough along a course many times the length of the device itself.

A further object is to provide a device which will admit air from the exterior of the boiler or furnace, pre-heat the same, and cause the pre-heated air to travel or be ejected from a head or nozzle provided on the device in a flat or horizontal curtain covering an area at least one-half the surface of the fuel-bed and assuring a thorough mixing of the pre-heated air with the ascending gases of the fuel-bed, thereby effecting an appreciable saving in fuel.

A still further object of my invention is to provide a device of this kind in which a casing or housing is positioned directly over the fuel-bed and subjected to the heat from the fuel, the casing or housing being provided with a flat nose having a slot disposed preferably in a horizontal direction with the slot at a high point compared to the inlet for the air to said casing or housing and the intervening space formed into a circuitous passage with a natural tendency of the air as it becomes heated rising from the inlet to the exit in its course along said circuitous passage.

With the above and other objects to appear hereinafter, my invention consists in a fuel-economizer attached directly to the door of the fuel-feed opening of a boiler or furnace.

It also consists in providing a casing or housing positioned directly over the bed of fuel and having a circuitous air-passage therethrough with an inlet for the air at a low point leading to said passage and an exit for the air after passing through said passage, the air being heated in its course through said passage and being ejected in a flat horizontal stream or curtain at an angle to the gases ascending from the bed of fuel.

It further consists in the novel features of construction and in the arrangement and combination of parts to be hereinafter described and more particularly pointed out in the subjoined claim.

In the drawing Fig. 1 is a front elevation of a hot-air furnace showing the door of the fuel-feed opening leading to the combustion chamber of the furnace in open position and my improved fuel-economizer attached to the inner side of the door.

Figure 1:
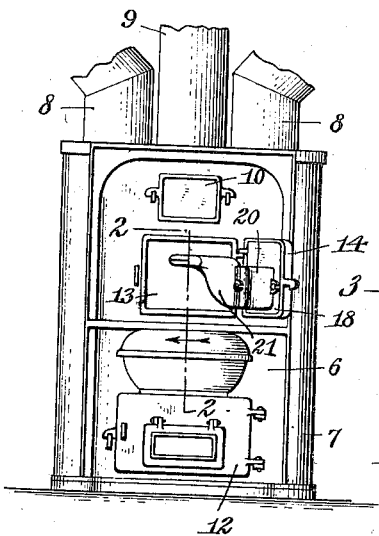
Figure 2:
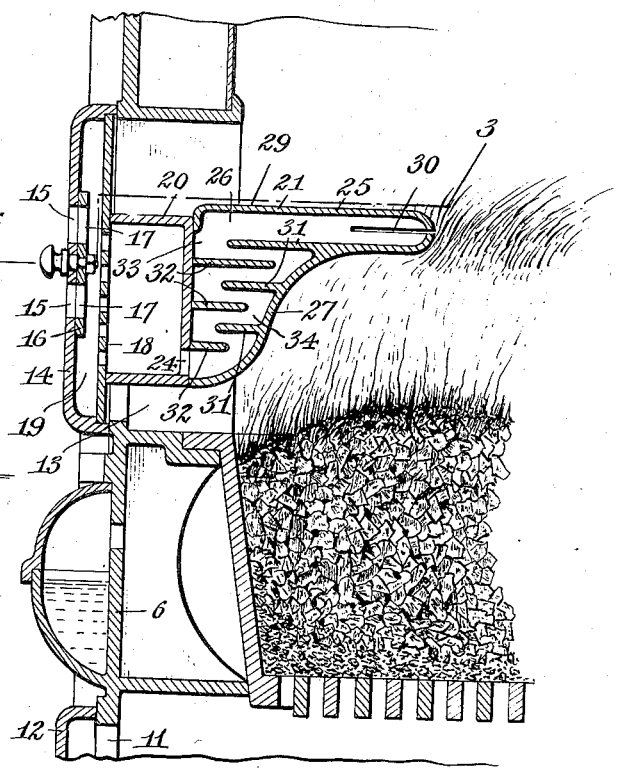
Fig. 2 is an enlarged vertical section through a portion of the furnace taken on line 2—2, Fig. 1, looking in the direction of the arrow crossing said line, and showing the door of the fuel-feed opening closed.
Figure 3:
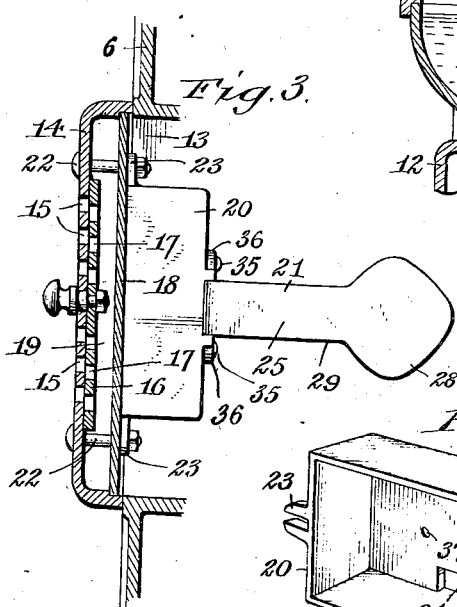
Fig. 3 is a horizontal section taken on or about line 3—3, Fig. 2.

In the drawing, I have shown my fuel-economizer applied to a hot-air furnace, but the mode of applying the same does not vary when utilized in connection with a steam or hot-water boiler.

Referring now to the drawing in detail, the reference numeral 6 designates the usual cast-iron front of a hot-air furnace, which is cast with or has attached thereto the usual inner casing of a furnace; and 7 designates the outer casing which is separated from the inner casing by an intervening space in a manner commonly understood. This intervening space serves as the air-heating space and leads to a space above the dome of the inner casing, to which one or more hot-air tubes 8 are connected. It will also be understood that a suitable smoke-pipe 9 leads from the interior of the inner casing above the fuel-bed and that suitable dampers are provided in the smoke-pipe and hot-air tubes.

As is common in furnace or boiler constructions, a clean-out opening is provided which is closed by a door 10, and it is also provided near its lower end with a door-opening 11 leading to the ash-pit of the furnace, which is closed by a door 12.

The cast-iron front 6 is also provided with the usual fuel-feed opening 13 which is closed by a door 14. This fuel-feed opening may vary in depth, depending on the nature of the furnace; a hot-air furnace having usually a fuel-feed opening of greater depth than a steam or hot-water boiler or heater, and the depths of the fuel-feed openings vary somewhat in different makes of hot-air furnaces. As is common in furnaces and boiler or heater constructions, the door 14 is provided with air-inlet openings 15 arranged for co-operation with a damper 16 to regulate the amount of air admitted to the combustion chamber. In the drawing I have shown the horizontally-sliding form of damper provided with openings 17 adapted to register with the air-inlet openings 15 in the door 14, or to partly or entirely close said openings, depending on the amount of air desired. Applied to the door 14 is the usual perforated plate 18 through the perforations of which air is directed into the combustion chamber after passing through the openings 15 and 17, this plate being separated from the front of the door by an intervening air space 19.

The parts thus far described are common to hot-air furnaces and boilers or heaters, but regardless of the construction of the furnace or boiler or heater, a fuel-feed opening invariably leads to the combustion chamber and this is closed by a door provided with some form of damper-mechanism enabling the regulation of the flow of air through the door to the bed of fuel within the combustion chamber. The air, however directed into the combustion chamber, upon opening the damper is comparatively cold and ineffective except to supply the necessary oxygen for maintaining the fire when checked, although the door equipped with such damper is invariably quite hot and radiates considerable heat where it is not required.

Figure 4:
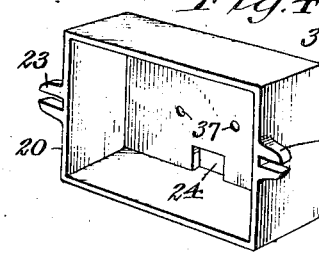
Fig. 4 is a detached perspective view of the air-chamber forming a part of my improved fuel-economizer.
Figure 5:
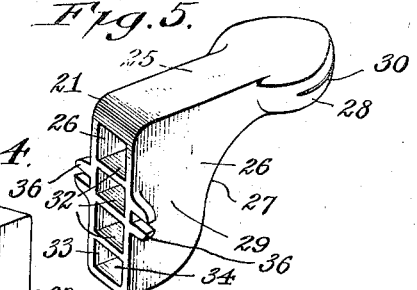
Fig. 5 is a detached perspective view of the fuel-economizer proper, which may in some instances be attached directly to the door of the fuel-feed opening, while in other instances it will be attached to the air-chamber shown in Fig. 4, which may vary in depth according to the depth of the fuel-feed opening.

My improved fuel-economizer comprises two main parts 20 and 21 which I term, respectively, an air-chamber and hollow head. The air-chamber 20 is best shown in Fig. 4 and comprises a box-like structure having an open front adapted to be closed by the perforated-plate 18, against which it is set and secured by means of bolts 22 passed through the door of the furnace and through bifurcated lugs 23 extending laterally from the end walls of the air-chamber. The inner wall of this air chamber or box-like structure is provided centrally between its ends and adjacent the bottom wall with an air-opening 24 which serves as the air-outlet of this air-chamber, the perforations in the perforated plate 18 serving as air-inlets for the chamber. The air chamber is comparatively wide and high and therefore covers an area of the perforated plate 18 having a large number of perforations. The bolts 22 are substituted for those usually employed to fasten the perforated plate 18 to the front of the door 14. They are however longer, since they serve to fasten the air-chamber 20 to the perforated plate while fastening the latter in place. Usually the perforated plate is provided with openings along regions which remain uncovered by the air-chamber 20, and these are to be filled with fire clay or some other suitable refractory filling material so that no cold air will enter the combustion chamber from the air space 19 of the door.

In the drawing I have shown a perforated plate in which the perforations are formed only in the region covered by the air-chamber 20. In such cases, this perforated plate can be made especially for use in connection with my fuel-economizers, and either perforations, slots, or other openings may be formed in this region, or a single opening provided, as may be desired. It may, however, be more economical to attach the air-chamber or box-like structure 20 to the perforated plate 18 forming part of the original furnace, and it is a simple matter to fill up such perforations as are not covered by the air-chamber. In either case, this air-chamber covers a considerable area of the plate 18 and consequently shields the door 14 from heat, which results in a considerable saving of fuel. Moreover, when applying the air-chamber to a used furnace and utilizing a perforated plate on the door thereof as a support for the air chamber, the larger the air chamber is made the less the number of perforations in the plate that will have to be filled, which also results in considerable saving of material and labor in the application of the device to the furnace.

The hollow head 21 of my device is in the nature of a casing or housing of somewhat triangular formation as viewed from the side. It is comparatively narrow and comprises a top wall 25, side walls 26, and an inclined or obliquely trending combined rear and bottom wall 27, preferably of ogee contour; the greatest height of this head being at the front and from this point it is reduced in height toward its rear end, where its side walls are bulged outwardly and its top and bottom walls widened to form a laterally-extended nose 28, which is to be considered as a part or member of the hollow head. This nose is somewhat wider than the body portion 29 of the head and the edge wall thereof is curved and provided with a horizontal slit 30 extending preferably through a region of at least 180 degrees. By making the hollow head comparatively narrower than the air-chamber to which it is secured, it will not come in contact with a side wall of the fuel-feed opening when opening the door 14. If, however, this hollow head were made as wide as the air-chamber 20, a hinged connection would be necessary between the two in order to permit of opening the door, which in course of time would fail to operate freely under action of the heat applied thereto, and no advantage would result from such an arrangement.

This hollow head is provided internally with horizontally-disposed partitions 31, 32, the partitions 31 extending forwardly from the inclined or ogee wall 27 and terminating short of the open front end 33 of the head and the partitions 32 extending rearwardly from the open front end 33 of this head and terminating short of the inclined or ogee wall 27. The partitions 31 are spaced from the partitions 32 but are in overlapping relation thereto so that a circuitous passage 34 is formed through the head, several times the length of the latter; the passage so formed having progressively higher passage regions which are progressively lengthened and which assure maximum heating of the air in its travel back and forth while ascending to the slit 30 or escape opening for the pre-heated air. The lower end of this passage, which terminates beneath the front end of the lowermost partition 32, registers with the opening 24 in the air-chamber and the upper end terminates within the nose 28. It is therefore to be noted that by disposing the partitions horizontally and giving the air entering the head a natural upward trend without compelling the same to travel in a downward direction along any portion of its course, the air is not only subjected to the heat applied to the exterior wall of the hollow head but also to the heat transferred to said partitions without compelling it to travel counter to its natural course.

This hollow head rests against the rear wall of the air-chamber 20 and is secured thereto by means of bolts 35 passed through bifurcated lugs 36 extending laterally from the side walls of the hollow head and through bolt-holes 37 in the rear wall of the air-chamber; suitable nuts (not shown) being applied to the bolts within the air-chamber to secure the bolts in place.

It will be apparent that by arranging the horizontal slit 30 in the nose of the device as described, the pre-heated air will be distributed over the major portion of the surface of the bed of fuel within the combustion chamber, and I prefer to make the walls of the head comparatively thick so that when once heated they will retain the heat and assure a thorough pre-heating of the air passing through the circuitous passage therein. The nose 28 of the air-preheating head, as it may be termed, may be enlarged and given various forms, so that the air-escape slit 30 therein will trend along a region of considerably more than 180 degrees, if desired. This, however, is a matter of detail and may be varied, as occasion may demand.

It will also be apparent that, depending on the depth of the fuel-feed opening, the air-chamber may be diminished or decreased in depth and that in some instances the air-chamber may be dispensed with and the air-preheating head applied directly to the door closing the fuel-feed opening.

Under the alternate arrangements set out herein I am enabled to attach my fuel-economizer to any style or pattern of furnace or boiler door, and the manner of attaching the same enables me to utilize the regular air-inlet on the furnace or boiler door provided by the manufacturer of the furnace or boiler.

My improved device enables me, furthermore, to provide at all times a constant supply of preheated air over the fuel-bed. It frequently occurs that the operator of a furnace or boiler closes the damper in the smoke-pipe, which greatly reduces or eliminates draft in the combustion chamber; but owing to the construction of the air-preheating head a constant flow of heated air is assured, even under such conditions, for the reason that the relatively cold air entering through the furnace door is admitted to the bottom of the circuitous passage in said head, and by reason of the walls of this head being heated and retaining its heat, the natural tendency of the air entering said passage at its lowest point is to rise. When the damper in the smoke-pipe is opened, the velocity of the air passing through the head is materially increased.

I have further ascertained by experiments that supplying pre-heated air over the bed of fuel, and particularly in a manner to intersect the rising gases, causes complete consumption of the gases, and in leaky furnaces which previously allowed gases to enter the hot-air space within the furnace and caused its delivery to the rooms mingled with the heated air, the application of this device has completely eliminated the delivery of gases or gas odors to the rooms.

While I have shown my invention applied directly to the door closing the fuel-feed opening, it will be understood that the device may be applied to the fixed wall of the combustion chamber, but this would necessitate the forming of an opening through both the outer casing of the furnace and the wall of the combustion chamber in order to introduce air to the air-preheating head, which would result in expense and the employment of considerable labor. Such an arrangement would therefore only be suitable for use in connection with new boilers or furnaces, whereas the application of the device to the door of the fuel-feed opening enables its ready installation to any old type of furnace or boiler without the use of experienced workmen.

Where, in the claim, the term "wall of the combustion chamber" is referred to, it is my intention to include in this term the door which closes the fuel-feed opening of the boiler or furnace, since it in reality is a movable part of the wall of the combustion chamber, even though in some instances it is more distant from the vertical center or axis of the combustion chamber than other portions of the wall.

Having thus described my invention what I claim is:

In a boiler or furnace having a combustion chamber, a fuel-feed opening leading thereto and a door for closing said fuel-feed opening, the combination of a box-like air-chamber having its outer side open and being otherwise closed by walls, said air-chamber being secured to said door, the inner wall of said air-chamber having an opening at a low point centrally between its ends, and an air-preheating head secured to the inner wall of said air-chamber and being comparatively narrow and of substantially triangular formation to overhang the bed of fuel within said combustion chamber, said air-preheating head having an open front closed by the rear wall of said air-chamber and being provided with a top wall, side walls, and a combined rear and bottom wall trending in an oblique direction, partitions in said head extending from the open front thereof inwardly and spaced from the said obliquely-trending combined inner and bottom wall, and other partitions within said head extending outwardly from said last-mentioned wall and terminating short of the open front of said head, said last-mentioned partitions being spaced from said first-mentioned partitions to form a circuitous passage within said head opening at its lower end into said air-chamber through the opening in the inner wall thereof and terminating at a high point in the angle formed by said upper and obliquely-trending combined inner and bottom walls, said head having an opening for the escape of pre-heated air at said angle to direct pre-heated air over the bed of fuel at an angle to the gases ascending therefrom.

WILLIAM C. McKEOWN.